US011210513B2

(12) United States Patent
Endoh et al.

(10) Patent No.: US 11,210,513 B2
(45) Date of Patent: Dec. 28, 2021

(54) DETECTION METHOD AND DETECTION DEVICE

(71) Applicant: FUJITSU LIMITED, Kawasaki (JP)

(72) Inventors: Toshio Endoh, Yokohama (JP); Keizo Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 16/660,743

(22) Filed: Oct. 22, 2019

(65) Prior Publication Data

US 2020/0134313 A1 Apr. 30, 2020

(30) Foreign Application Priority Data

Oct. 30, 2018 (JP) .............................. JP2018-204393

(51) Int. Cl.
G06K 9/00 (2006.01)
G06N 20/00 (2019.01)
G06N 3/08 (2006.01)
G06N 3/04 (2006.01)
G06K 9/66 (2006.01)
G06K 9/62 (2006.01)
G06K 9/46 (2006.01)

(52) U.S. Cl.
CPC ..... G06K 9/00624 (2013.01); G06K 9/00369 (2013.01); G06K 9/4628 (2013.01); G06K 9/6256 (2013.01); G06K 9/66 (2013.01); G06N 3/0454 (2013.01); G06N 3/08 (2013.01); G06N 20/00 (2019.01); *G06T 2207/20081* (2013.01)

(58) Field of Classification Search
CPC .... G06K 9/00624; G06K 9/66; G06K 9/6256; G06K 9/00369; G06K 9/4628; G06K 9/50; G06K 9/627; G06K 9/3233; G06N 20/00; G06N 3/08; G06N 3/0454; G06N 3/084; G06T 2207/20081
See application file for complete search history.

(56) References Cited

U.S. PATENT DOCUMENTS

2008/0075360 A1* 3/2008 Li .................. G06K 9/4652 382/155
2013/0259307 A1* 10/2013 Torii .................. G06K 9/00369 382/103

FOREIGN PATENT DOCUMENTS

JP 2013-210968 10/2013

* cited by examiner

*Primary Examiner* — John W Lee
(74) *Attorney, Agent, or Firm* — Fujitsu Patent Center

(57) ABSTRACT

A computer-implemented detection method includes, in response to inputting a first image including a region of one or more objects to a learned model, identifying a first entire image corresponding to entirety of a first object as a detection candidate, the learned model being generated by learning training data including an image corresponding to a part of an object and an entire image corresponding to entirety of the object, detecting an existing region of the first target object in the first image in accordance with a comparison between the identified first entire image and the region of the one or more target objects, and determining, based on a specific image obtained by invalidating the existing region in the first image, whether another target object is included in the first image.

12 Claims, 24 Drawing Sheets

FIG. 10

| PREDICTOR NUMBER | PREDICTED IMAGE 1 | MASK 1 | OBJECT POSITION 1 | PREDICTED IMAGE 2 |
|---|---|---|---|---|
| 1 | IMAGE 11 | MASK 11 | POSITION 11 | IMAGE 12 |
| 2 | IMAGE 21 | MASK 21 | POSITION 21 | IMAGE 22 |
| 3 | IMAGE 31 | MASK 31 | POSITION 31 | IMAGE 32 |
| ... | ... | ... | ... | ... |

FIG. 19

| NUMBER IN ASCENDING ORDER OF ERRORS | PREDICTED IMAGE NUMBER | ERROR | COMPARISON WITH THRESHOLD VALUE 0.1 |
|---|---|---|---|
| 1 | IMAGE 31 | 0.08 | OK |
| 2 | IMAGE 11 | 0.11 | NG |
| 3 | IMAGE 21 | 0.20 | NG |

DETECTION METHOD AND DETECTION DEVICE

CROSS-REFERENCE TO RELATED APPLICATION

This application is based upon and claims the benefit of priority of the prior Japanese Patent Application No. 2018-204393, filed on Oct. 30, 2018, the entire contents of which are incorporated herein by reference.

FIELD

The embodiments discussed herein are related to a detection technology.

BACKGROUND

In recent years, deep learning has been used to detect an object from image data. In such object detection, image data of an automobile, a person, or the like and a label are learned as training data, and an object to be detected is detected from test data using a learned model, for example. In some cases, however, an object is partially blocked by another object in the test data. For example, a person stands behind an automobile. In view of the situation, training data including combinations of a plurality of objects may be used. However, this results in an enormous number of training data. Alternatively, it is conceivable to perform learning using training data for each object and detect each object. However, there is an issue that in a case where an object is partially blocked by another object, the detection accuracy decreases.

There are cases where an object is partially blocked by another object. For such cases, a detector that detects a part of an object has been proposed. In this proposal, a plurality of such detectors is prepared, and a common specific part of the object is estimated from detection results of the plurality of detectors. In a case where the results of estimation match with each other, the detection result is output.

An example of the related art is disclosed in Japanese Laid-open Patent Publication No. 2013-210968.

SUMMARY

According to an aspect of the embodiment, a computer-implemented detection method includes, in response to inputting a first image including a region of one or more objects to a learned model, identifying a first entire image corresponding to entirety of a first object as a detection candidate, the learned model being generated by learning training data including an image corresponding to a part of an object and an entire image corresponding to entirety of the object, detecting an existing region of the first target object in the first image in accordance with a comparison between the identified first entire image and the region of the one or more target objects, and determining, based on a specific image obtained by invalidating the existing region in the first image, whether another target object is included in the first image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of an output of each predictor;

FIG. 19 is a diagram illustrating an example of a detection candidate based on results of comparison;

DESCRIPTION OF EMBODIMENTS

In some cases, in a case where an object is partially blocked and only a part of the object is detectable, only one detector may detect the object. In this case, because the results of estimation do not match with each other, the final detection may fail. In the related art, therefore, there are cases where the detection accuracy for image data including partial blocking decreases.

Hereinafter, embodiments of a detection method, a detection program, and a detection device disclosed in the present application will be described in detail with reference to the drawings. The embodiments do not limit the disclosed technology. The following embodiments may be combined with each other as appropriate as long as no contradiction arises.

Figure 1:
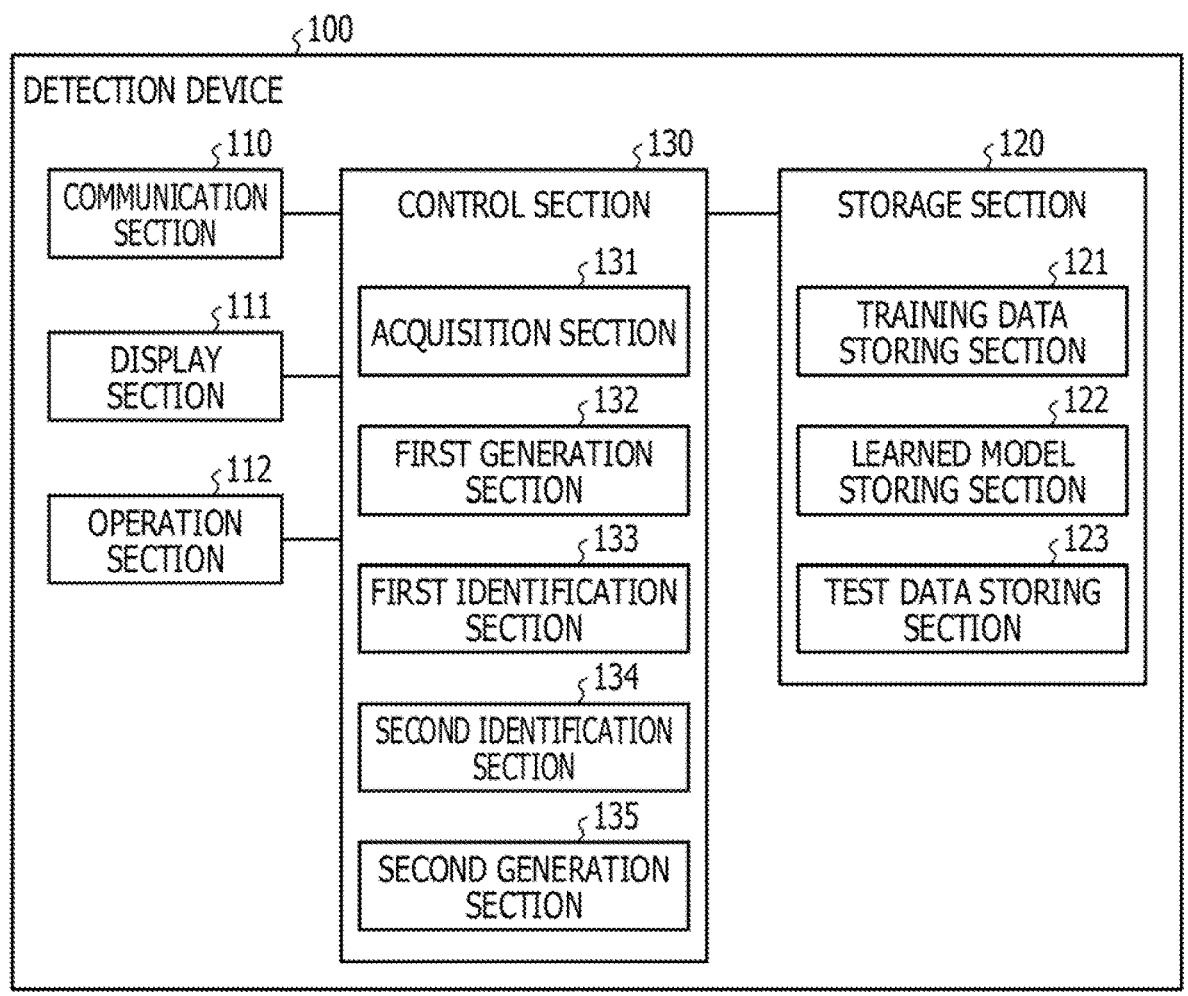
FIG. 1 is a block diagram illustrating an example of a configuration of a detection device according to a first embodiment.

FIG. 1 is a block diagram illustrating an example of a configuration of a detection device according to the first embodiment. A detection device 100 illustrated in FIG. 1 is an information processing device that detects an object from an image using machine learning. From image data, the detection device 100 detects the type and the position of a target object included in the image data. For example, the detection device 100 generates a learned model by learning training data. In the training data, cut-out image data and an existing region that correspond to a part of a target object are associated with entire image data and an existing region of the target object. The detection device 100 identifies the entire image data and the existing region of the target object that are output based on a part of the image data input to the generated learned model and are predicted from the part of the image data. The detection device 100 identifies the position of the target object in the image data based on the result of comparison in the existing region between the identified entire image data and the image data. The detection device 100 generates image data in which the identified existing region has been invalidated on the image data. In this manner, the detection device 100 may increase the detection accuracy for image data including partial blocking.

Figure 2:
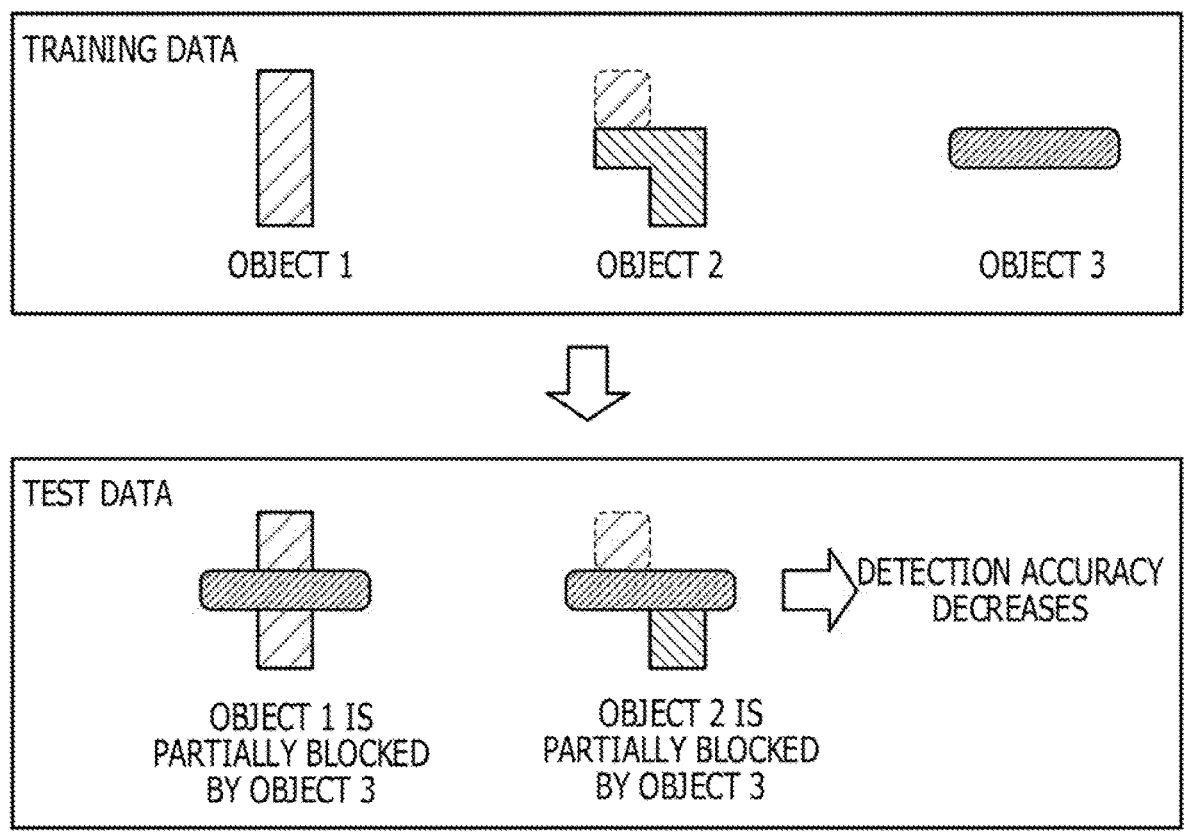
FIG. 2 is a diagram illustrating an example of a case where use of training data for each object results in a decrease in detection accuracy.

A case where the detection accuracy decreases will be described with reference to FIGS. 2 and 3. In the following description, image data may be simply referred to as an image. FIG. 2 is a diagram illustrating an example of a case where use of training data for each object results in a decrease in detection accuracy. The example in FIG. 2 uses a detector that has learned each of an object 1, an object 2, and an object 3 as the training data. In this case, when image data in which the object 1 is partially blocked by the object 3 is input to the detector as test data, the accuracy of detecting the object 1 decreases. This is because, since the object 1 is partially blocked by the object 3, the similarity with the training data of the object 1 decreases. When image data in which the object 2 is partially blocked by the object 3 is input to the detector as test data, the accuracy of detecting the object 2 decreases. This is because, since the object 2 is partially blocked by the object 3, the similarity with the training data of the object 2 decreases. In order to cope with a decrease in the detection accuracy caused by such partial blocking, it is conceivable to use a part of an object as the training data.

Figure 3:
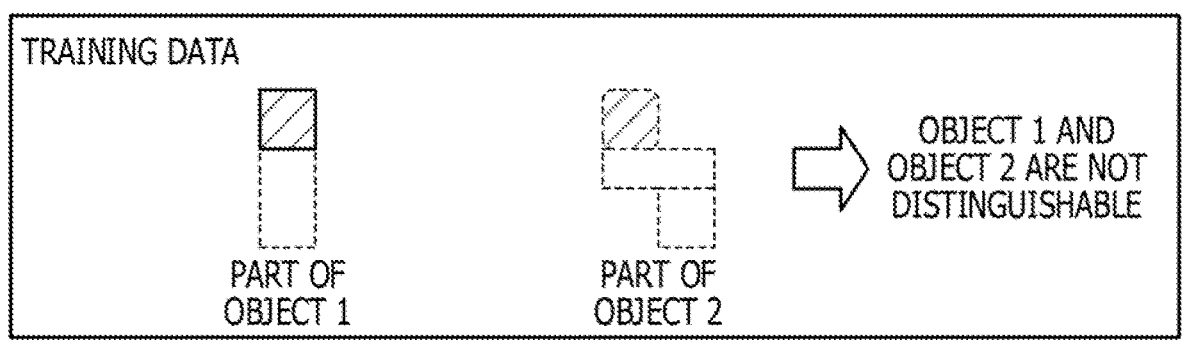
FIG. 3 is a diagram illustrating an example of a case where use of a part of each object as training data results in a decrease in detection accuracy.

FIG. 3 is a diagram illustrating an example of a case where use of a part of each object as training data results in a decrease in detection accuracy. The example in FIG. 3 uses a part of the object 1 and a part of the object 2 as the training data. The difference between the part of the object 1 and the part of the object 2 lies in the presence or absence of rounded corners and outline. In this case, while the similarity between the test data in FIG. 2 and the training data in FIG. 3 is high, it is difficult to make a distinction between the object 1 and the object 2. As a result, the accuracy of detecting the object 1 and the object 2 decreases. In a case where a part of an object is used as training data, it is difficult to generate, in advance, training data that matches an unblocked portion. Consequently, in many cases, a part of an object significantly made smaller than the entire object is desired in the training data.

Figure 4:
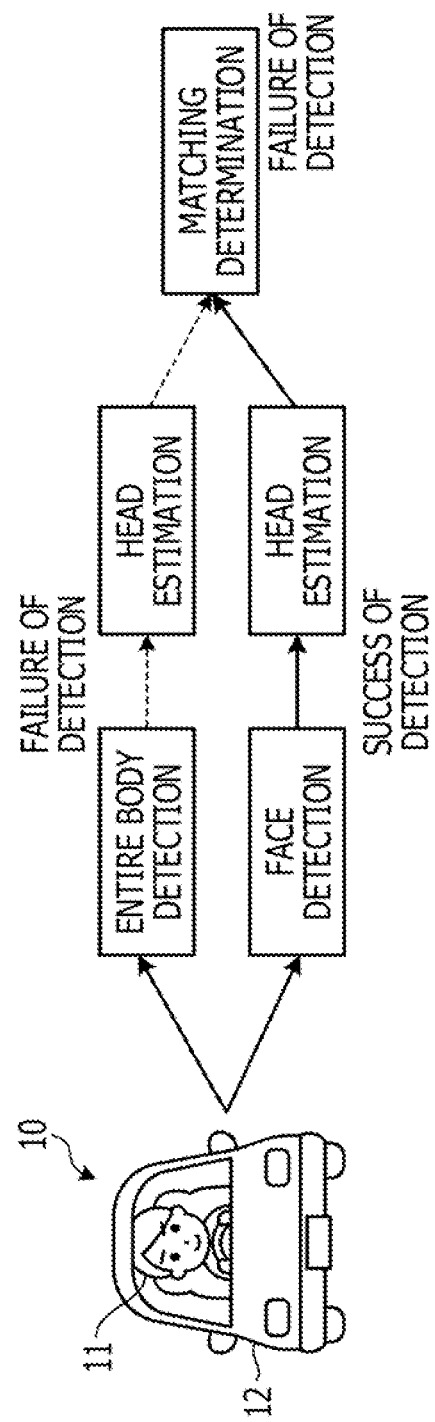
FIG. 4 is a diagram illustrating an example of a case where results of estimation using a plurality of detectors do not match with each other.

A case where only one detector detects an object and the final detection fails in the related art will be described with reference to FIG. 4. FIG. 4 is a diagram illustrating an example of a case where results of estimation using a plurality of detectors do not match with each other. As illustrated in FIG. 4, a target object 10 is a combination of a person 11 and an automobile 12. The example in FIG. 4 uses a detector that detects the entire body of the person 11 and a detector that detects the face of the person 11. In this case, since the lower body of the person 11 is blocked by the automobile 12, the entire body detection results in failure to estimate the head of the person 11. On the other hand, since the upper body of the person 11 is not blocked, the face detection results in success to estimate the head of the person 11. In determining whether the results of estimation match with each other, the detection failure of the entire body detection does not match the detection success of the face detection. Thus, the final detection results in failure. In the related art, therefore, the object detection fails in a case where only a part of an object is detectable due to partial blocking.

Next, a configuration of the detection device 100 according to the first embodiment will be described. As illustrated in FIG. 1, the detection device 100 includes a communication section 110, a display section 111, an operation section 112, a storage section 120, and a control section 130. In addition to the functional sections illustrated in FIG. 1, the detection device 100 may include various types of functional sections included in a known computer. Examples of the functional sections include various types of input devices, voice output devices, and the like.

The communication section 110 is implemented by a network interface card (NIC) or the like, for example. The communication section 110 is a communication interface that is coupled to another information processing device by wire or wirelessly via a network, not illustrated, and manages communication of information with another information processing device. The communication section 110 receives training data and test data from another information processing device. The communication section 110 outputs the received training data and test data to the control section 130.

The display section 111 is a display device that displays various types of information. As the display device, the display section 111 is implemented by a liquid-crystal display or the like, for example. The display section 111 displays various types of screens such as a display screen and the like input from the control section 130.

The operation section 112 is an input device that receives various types of operations from the user of the detection device 100. As the input device, the operation section 112 is implemented by a keyboard, a mouse, and the like, for example. The operation section 112 outputs the operation that has been input by the user to the control section 130 as operation information. As the input device, the operation section 112 may be implemented by a touch panel or the like. The display device of the display section 111 and the input device of the operation section 112 may be integrated with each other.

The storage section 120 is implemented by a semiconductor memory element such as a random access memory (RAM), a flash memory, or the like, or a storage device such as a hard disk, an optical disc, or the like. The storage section 120 includes a training data storing section 121, a learned model storing section 122, and a test data storing section 123. The storage section 120 stores information used for processing in the control section 130.

Figure 5:
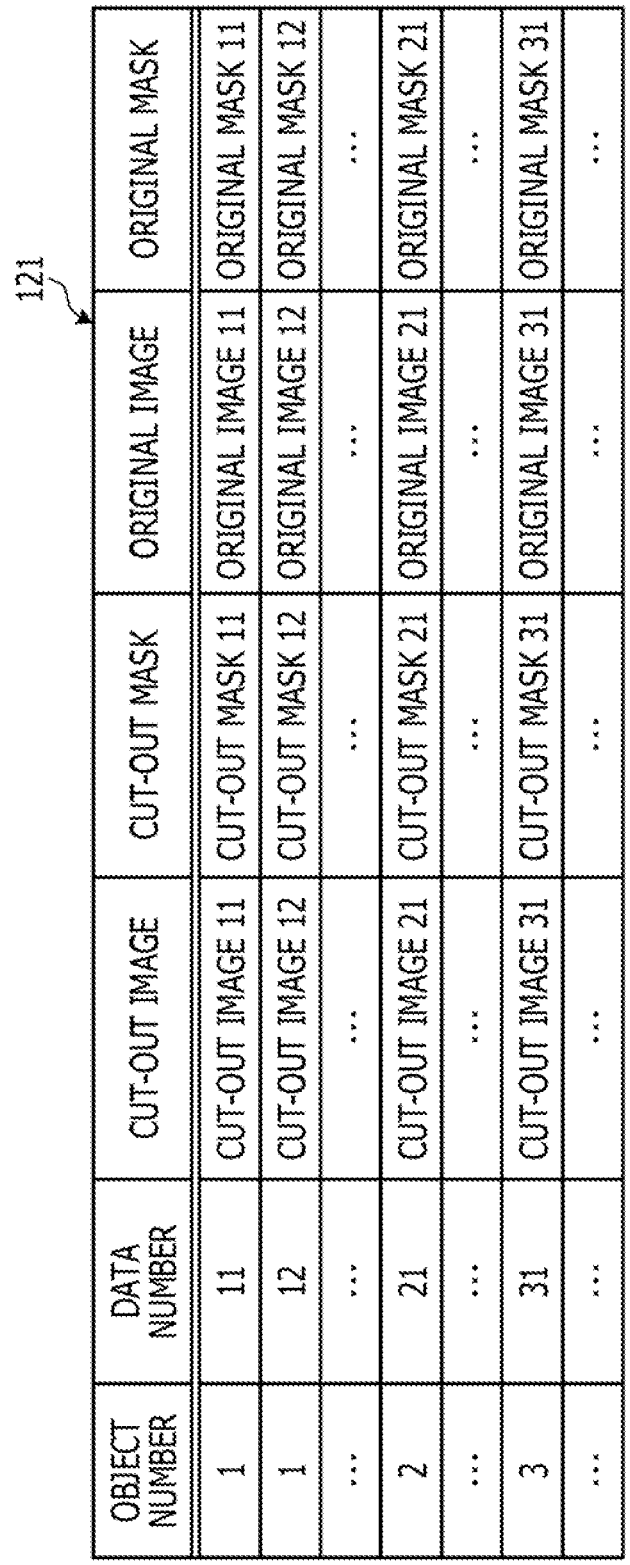
FIG. 5 is a diagram illustrating an example of a training data storing section.

The training data storing section 121 stores training data. In the training data, an image (cut-out image) and a mask of a part of an object are associated with an image (entire image) and a mask of the entire object. The mask represents an existing region of the part of the object or the entire object in the image data. FIG. 5 is a diagram illustrating an example of a training data storing section. As illustrated in FIG. 5, the training data storing section 121 includes items such as "object number," "data number," "cut-out image," "cut-out mask," "original image," and "original mask."

The "object number" is an identifier for identifying an object (target object) to be detected. The "data number" is an identifier for identifying each cut-out image data in a case where a plurality of cut-out images is cut out from one object. Each of the plurality of cut-out images corresponds to a part of the object. The "cut-out image" is information indicating cut-out image data corresponding to a part of an object. The "cut-out mask" is information indicating a region (existing region) corresponding to the cut-out image data. The "original image" is information indicating the entire image data corresponding to the entire object. The "original mask" is information indicating a region (existing region) corresponding to the entire image data.

The learned model storing section 122 stores a learned model that has learned training data using machine learning. In the training data, cut-out image data and an existing region of a target object are associated with entire image data and an existing region of the target object. For each object, the learned model outputs entire image data and an existing region of the corresponding object based on the input of cut-out image data and an existing region. The learned model is, for example, a collection of learning parameters of predictors that correspond to individual objects. The learned model is obtained by performing deep learning using a neural network in which each pixel of images and masks corresponding to existing regions are used as the feature. For example, a convolutional neural network (CNN) may be used as the neural network. The learned model storing section 122 stores various types of parameters (weighting coefficients) and the like of the neural network as the learning parameters, for example.

Figure 6:
FIG. 6 is a diagram illustrating an example of a learning result of each predictor in a learned model storing section.

FIG. 6 is a diagram illustrating an example of a learning result of each predictor in a learned model storing section. As illustrated in FIG. 6, a learning result 122*a* includes items such as "object number" and "learning parameter." For example, the learning result 122*a* represents learning parameters, which are the learning results of the predictors that correspond to individual objects in the learned model.

The "object number" is an identifier for identifying an object (target object) to be detected. The "object number" also serves as an identifier for identifying a predictor. The "learning parameter" is information indicating a learning parameter of a corresponding predictor. The learning parameter is, for example, a number sequence in which weights of the neural network are arranged using a given method.

The test data storing section 123 stores test data. The test data is image data to be detected. For example, the test data includes an image in which an object to be detected (target object) includes a blocked portion. The test data may include an image including an object that does not include any blocked portion, for example, an object that is placed in the front among a plurality of objects to be detected.

Returning to FIG. 1, the control section 130 is implemented through execution of a program stored in an internal storage device by a central processing unit (CPU), a micro processing unit (MPU), or the like with the use of the RAM as a work area, for example. Alternatively, the control section 130 may be implemented by an integrated circuit such as an application-specific integrated circuit (ASIC), a field-programmable gate array (FPGA), or the like. The control section 130 includes an acquisition section 131, a first generation section 132, a first identification section 133, a second identification section 134, and a second generation section 135. The control section 130 implements or executes functions or effects of information processing described below. The internal configuration of the control section 130 is not limited to the configuration illustrated in FIG. 1 and may be another configuration as long as the information processing described later is executable with the configuration.

The acquisition section 131 receives and acquires training data from the information processing device, not illustrated, at the time of learning. The acquisition section 131 stores the acquired training data in the training data storing section 121. The acquisition section 131 receives and acquires test data from the information processing device, not illustrated, at the time of detection. The acquisition section 131 stores the acquired test data in the test data storing section 123. The acquisition section 131 is different from the acquisition section that corresponds to the first identification section 133 and acquires the learned model stored in the learned model storing section 122.

The first generation section 132 generates a learned model by learning training data using machine learning. For example, the first generation section 132 reads training data from the training data storing section 121 and learns the training data for each object (target object) using machine learning to generate learning parameters. The learning parameters are the learning results of the predictors that correspond to individual objects. The first generation section 132 associates each of the generated learning parameters with a corresponding one of the objects and stores the associated learning parameters and objects in the learned model storing section 122 as the learned model. For example, the first generation section 132 generates a learned model by learning training data. In the training data, cut-out image data and an existing region that correspond to a part of a target object are associated with entire image data and an existing region of the target object. For example, the first generation section 132 inputs cut-out image data and an existing region (mask) to the neural network. At the time of learning, the first generation section 132 allocates the output of the neural network to the entire image data and the existing region and adjusts the weights of the neural network by backpropagation so as to obtain a desired output.

Figure 7:
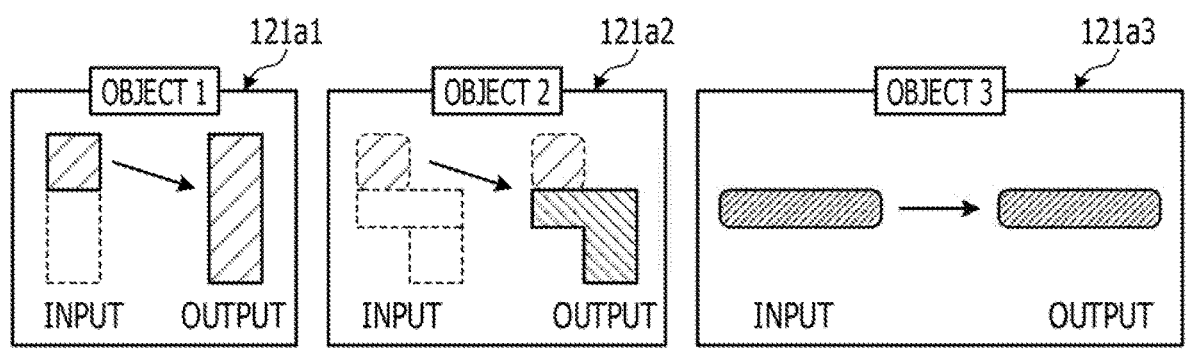
FIG. 7 is a diagram illustrating an example of training data.

The training data will be described with reference to FIG. 7. FIG. 7 is a diagram illustrating an example of training data. The masks are omitted in FIG. 7. As illustrated in FIG. 7, training data 121*a*1 is obtained by associating a cut-out image that is the input of the object 1 with an original image (the entire image of the object 1) that is the output of the object 1. Training data 121*a*2 is obtained by associating a cut-out image that is the input of the object 2 with an original image (the entire image of the object 2) that is the output of the object 2. Training data 121*a*3 is obtained by associating a cut-out image that is the input of the object 3 with an original image (the entire image of the object 3) that is the output of the object 3. The training data 121*a*3 is for a case where the entire image of the object 3 is used as the cut-out image for the input. For example, the cut-out images may have a square shape with random, given sizes and may be generated by cutting out each object into a plurality of cut-out images.

When the first identification section 133 receives an instruction from the user to start detection processing, for example, the first identification section 133 refers to the learned model storing section 122 and reads the learned model, for example, the learning parameters to configure each predictor. The learning parameters are the learning results of individual predictors. For example, the first identification section 133 is an example of the acquisition section that acquires the learned model stored in the learned model storing section 122. When the first identification section 133 receives test data and a prediction instruction from the second generation section 135, the first identification section 133 executes prediction processing on the test data. In the following description, the test data will also be referred to as an input image.

As the prediction processing, the first identification section 133 first initializes the effective region for the input image to the entire screen. For example, the first identification section 133 sets an input mask by which the entire region of the input image becomes a target region from which an object is to be detected. When the first identification section 133 receives the prediction instruction from the second generation section 135, the first identification section 133 inputs the input image and the input mask to each predictor to generate predicted images, predicted masks, and object positions as prediction results. The second and subsequent prediction instructions include an input mask that excludes the existing region of the object that has already been detected from the effective region. The first identification section 133 outputs the input image and the input mask to the second identification section 134, together with the predicted image, the predicted mask, and the object position of each predictor.

For example, the first identification section 133 identifies the entire image data and the existing region (the predicted mask and the object position) of the target object that are output based on the part of the image data (partial image) input to the generated learned model and are predicted from the part of the image data. The first identification section 133 and the second generation section 135 generate image data in which the identified existing region has been invalidated on the image data.

Figure 8:
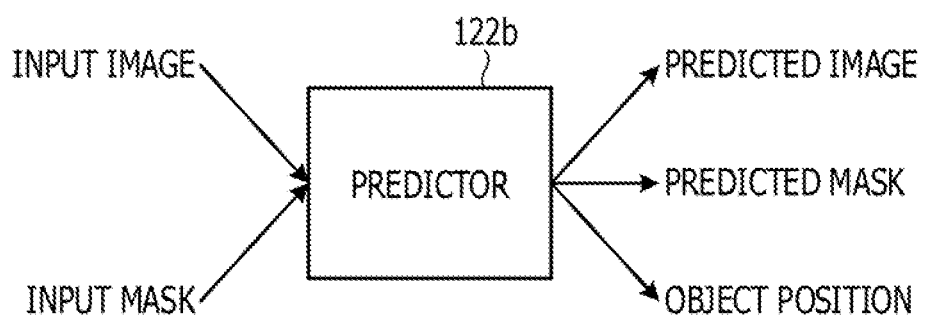
FIG. 8 is a diagram illustrating an example of input/output information of each predictor.

Each predictor will be described with reference to FIGS. 8 and 9. FIG. 8 is a diagram illustrating an example of input/output information of each predictor. As illustrated in FIG. 8, an input image and an input mask are input to a predictor 122b. The predictor 122b generates and outputs a predicted image, a predicted mask, and an object position based on the input image and the input mask that have been input. The predicted image is, for example, a color image that represents the predicted object in red, green, and blue (RGB). The predicted mask is, for example, a bitmap image corresponding to the predicted object and is an image in which pixels corresponding to the object are set to "1" while pixels other than the object are set to "0." The object position is, for example, information indicating the coordinates of a circumscribed rectangle of the object.

Figure 9:
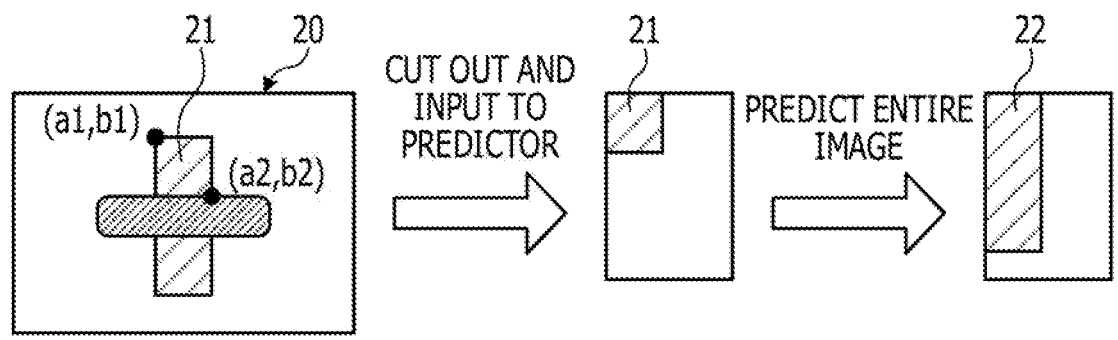
FIG. 9 is a diagram illustrating an example of how an entire image of an object is predicted.

FIG. 9 is a diagram illustrating an example of how an entire image of an object is predicted. How the entire image of an object is predicted in each predictor will be described in more detail with reference to FIG. 9. As illustrated in FIG. 9, the first identification section 133 cuts out partial images of various sizes from the entire region of an input image 20. For example, the first identification section 133 cuts out a partial image 21 represented by the coordinates (a1, b1, a2, b2) in the input image 20. The partial image 21 corresponds to a part of the object. The first identification section 133 aligns the position of the partial image 21 and inputs the partial image 21 to a predictor. Based on the input partial image 21, the predictor predicts an entire image 22 of the object as a predicted image and outputs the predicted image, together with a predicted mask corresponding to the entire image 22 and an object position representing the coordinates of a circumscribed rectangle of the entire image 22. For example, the first identification section 133 cuts out partial images of various sizes from various positions of the input image, inputs the partial images to the predictor (learned neural network), and uses the output of the predictor as predicted images. Therefore, the predictor outputs a number of predicted images.

FIG. 10 is a diagram illustrating an example of an output of each predictor. As illustrated in a table 23 in FIG. 10, there are various patterns of predicted images output from each predictor. In the table 23, the "predictor number" is an identifier for identifying a predictor. A "predicted image 1" is information indicating the first predicted image in each predictor. A "mask 1" is information indicating the first predicted mask in each predictor. An "object position 1" is information indicating the first object position in each predictors A "predicted image 2" is information indicating the second predicted image in each predictor. As in the first predicted image, a set of a predicted image, a predicted mask, and an object position is output for each of the second and subsequent predicted images. Each predictor may add certainty to a set of the predicted image, the predicted mask, and the object position to be output. Each predictor may also combine a set of the predicted image, the predicted mask, and the object position to be output in order of certainty.

Returning to FIG. 1, when the second identification section 134 receives the input image and the input mask from the first identification section 133 together with the predicted image, the predicted mask, and the object position of each predictor, the second identification section 134 compares the input image with each predicted image in the existing region represented by the corresponding predicted mask. The second identification section 134 identifies the position of the target object in the input image based on, for example, the area of a region whose error between the input image and the predicted image is small. For example, the second identification section 134 arranges a plurality of predicted images in ascending order of errors and sets, as a detection candidate, a predicted image whose error is equal to or less than a preset threshold value. The second identification section 134 identifies the position of the target object, for example, the existing region of the detection candidate in the input image. As long as the error is equal to or less than the preset threshold value, a plurality of predicted images may serve as detection candidates. As the error, the root mean square of the difference between pixel values in the effective region may be used, for example.

The second identification section 134 determines whether or not the detection candidate exists. In a case where the second identification section 134 has determined that the detection candidate exists, the second identification section 134 outputs the detection candidate, for example, to the display section 111 and displays the detection candidate on the display section 111 as the detection result. As the existing region of the object which is the detection result, the second identification section 134 also outputs the identified existing region of the detection candidate to the second generation section 135, together with the input mask. On the other hand, in a case where the second identification section 134 has determined that the detection candidate does not exist, the second identification section 134 ends the prediction processing.

In a case where there is a plurality of predicted images, predicted masks, and object positions (for example, existing regions of objects) that have been input in the first comparison, the second identification section 134 uses, in the second and subsequent comparisons, an input image in which the existing region of the object, which is the previous detection result, has been invalidated. For example, the second identification section 134 identifies the position of the target object corresponding to the existing region of the remaining object based on the result of comparison between the input image in which the existing region of the object, which is the previous detection result, has been invalidated and the predicted image of the remaining object.

For example, the second identification section 134 identifies the position of the target object in the image data based on the result of comparison between the identified predicted image and the image data. The second identification section 134 compares the identified predicted image with the image data and, as a result of the comparison, identifies the position of the target object in the image data based on the area of the region whose error is small. In a case where there is a plurality of identified existing regions, the second identification section 134 identifies the position of a corresponding target object based on the result of comparison between the image data in which the identified existing region has been invalidated and an identified predicted image.

For example, when the second generation section 135 receives an instruction to start the detection processing from the user, the second generation section 135 reads test data (input image) from the test data storing section 123 and outputs the test data and the prediction instruction to the first identification section 133.

When the second generation section 135 receives the existing region of the object, which is the detection result, and the input mask from the second identification section 134, the second generation section 135 updates the input mask by excluding the existing region of the object, which is the detection result, from the effective region. After updating the input mask, the second generation section 135 outputs a prediction instruction including the updated input mask to the first identification section 133.

An object detection flow focusing on an input image will be described with reference to FIG. 11. A specific example will be described with reference to FIGS. 12 to 19.

Figure 11:
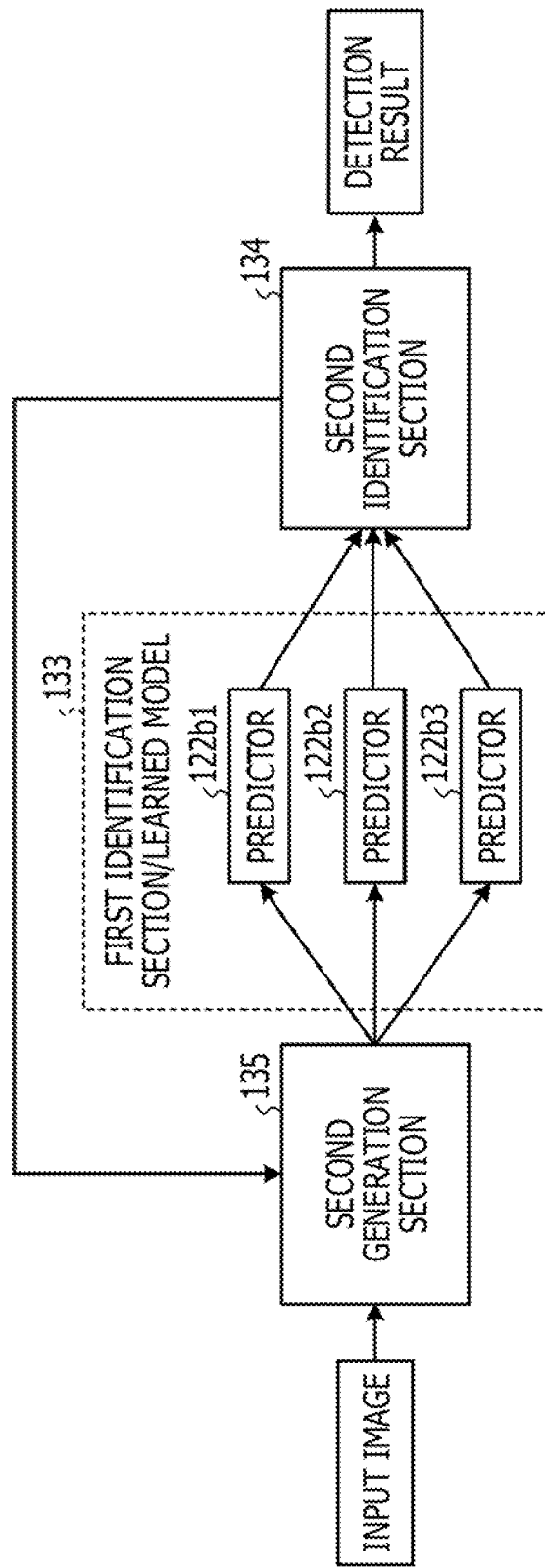
FIG. 11 is a diagram for describing an object detection flow, focusing on an input image.

FIG. 11 is a diagram for describing an object detection flow, focusing on an input image. As illustrated in FIG. 11, the second generation section 135 outputs an input image to the first identification section 133 in the first processing. The first identification section 133 sets an input mask in the input image by which the entire region becomes a target region from which an object is to be detected. The first identification section 133 inputs the input image and the input mask to each of predictors 122$b1$ to 122$b3$ of the learned model to generate a predicted image, a predicted mask, and an object position of each predictor. The first identification section 133 outputs the input image and the input mask to the second identification section 134 together with the predicted image, the predicted mask, and the object position of each of the predictors 122$b1$ to 122$b3$.

The second identification section 134 compares the input image with each predicted image in the existing region represented by the corresponding predicted mask and sets, as the detection candidate, a predicted image whose error is equal to or less than the preset threshold value. The second identification section 134 determines whether or not the detection candidate exists. In a case where the second identification section 134 has determined that the detection candidate does not exist, the second identification section 134 ends the processing. On the other hand, in a case where the second identification section 134 has determined that detection candidate exists, the second identification section 134 outputs the detection candidate as a detection result. As the existing region of the object which is the detection result, the second identification section 134 also outputs the identified existing region of the detection candidate to the second generation section 135 together with the input mask. When the second generation section 135 receives the existing region of the object, which is the detection result, and the input mask from the second identification section 134, the second generation section 135 updates the input mask by excluding the existing region of the object, which is the detection result, from the effective region. The second generation section 135 outputs the updated input mask and the input image to the first identification section 133 for prediction and detection of the next object.

Figure 12:
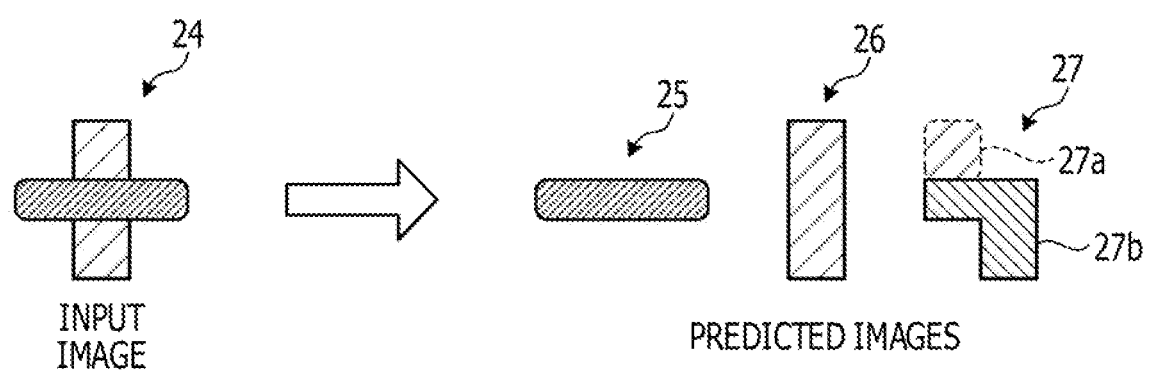
FIG. 12 is a diagram illustrating an example of how predicted images of objects are generated.
Figure 13:
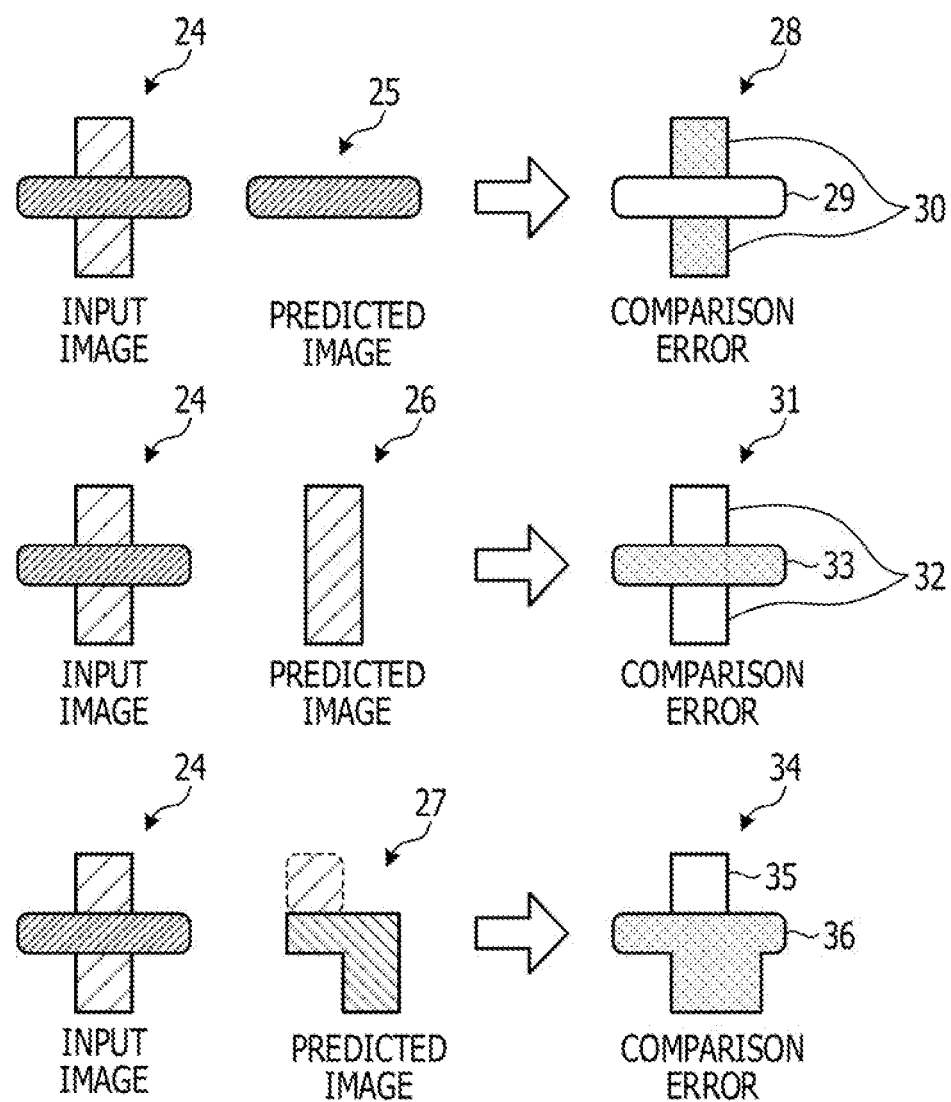
FIG. 13 is a diagram illustrating an example of how an input image is compared with predicted images.

FIG. 12 is a diagram illustrating an example of how predicted images of objects are generated. In the example in FIG. 12, predicted images 25 to 27 are generated for an input image 24. In the input image 24, the object 1 in FIG. 2 is partially blocked by the object 3 in FIG. 2. In FIGS. 12 to 19, a predicted image 26 corresponds to the object 1 in FIG. 2, a predicted image 27 corresponds to the object 2 in FIG. 2, and a predicted image 25 corresponds to the object 3 in FIG. 2. The object 1 and the predicted image 26 are colored in blue. The object 2 and the predicted image 27 include an upper region 27$a$ and a lower region 27$b$. The upper region 27$a$ has a square shape with rounded corners and is colored in blue, while the lower region 27$b$ has an inverted L shape and is colored in orange. The object 3 and the predicted image 25 are colored in green. In FIGS. 12 to 19, predicted masks and object positions are omitted unless description includes the predicted masks and the object positions, FIG. 13 is a diagram illustrating an example of how an input image is compared with predicted images. In FIG. 13, the input image 24 is compared with the predicted images 25 to 27. As illustrated in a comparison error 28, in the comparison between the input image 24 and the predicted image 25, a region 29 that overlaps with the predicted image 25 has a small error, while a region 30 that does not overlap with the predicted image 25 has a large error. As illustrated in a comparison error 31, in the comparison between the input image 24 and the predicted image 26, a region 32 that overlaps with the predicted image 26 has a small error, while a region 33 that does not overlap with the predicted image 26 has a large error. As illustrated in a comparison error 34, in the comparison between the input image 24 and the predicted image 27, a region 35 that overlaps with the predicted image 27 has a small error, while a region 36 that does not overlap with the predicted image 27 has a large error. For the comparison errors 28, 31, and 34, the second identification section 134 determines which of the predicted images 25 to 27 is correct based on, for example, the area of the region whose error is small. In the example in FIG. 13, it is assumed that the predicted image 25 is determined to be correct. The second identification section 134 may determine that a plurality of predicted images among the predicted images is correct.

Figure 14:
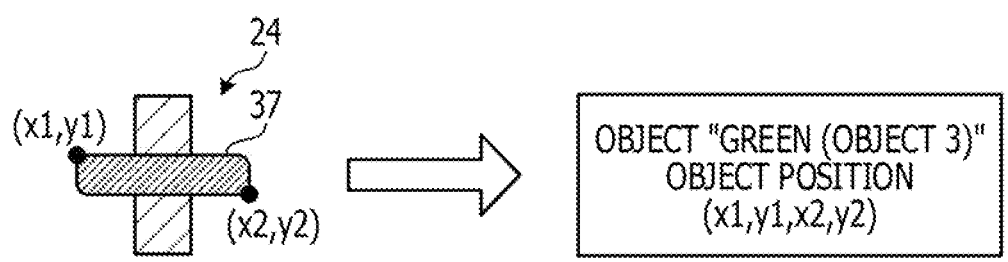
FIG. 14 is a diagram illustrating an example of a detection result.

FIG. 14 is a diagram illustrating an example of a detection result. As illustrated in FIG. 14, the second identification section 134 sets, as a detection candidate 37, the predicted image 25 that has been predicted as correct with respect to the input image 24. The second identification section 134 identifies the coordinates (x1, y1, x2, y2) of the object position of the detection candidate 37 in the input image 24. The second identification section 134 outputs the detection candidate 37 as the detection result. As the detection result, for example, the second identification section 134 outputs information such as "object "green (object 3)"" and "object position (x1, y1, x2, y2)."

Figure 15:
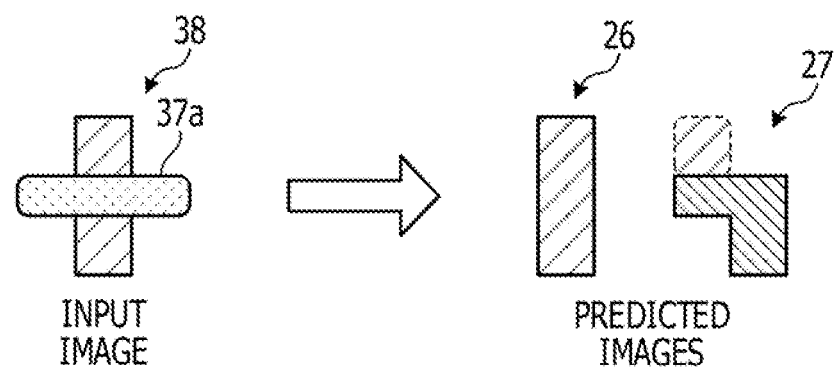
FIG. 15 is a diagram illustrating an example of how predicted images of objects are generated for the second time.

FIG. 15 is a diagram illustrating an example of how predicted images of objects are generated for the second time. In an input image 38 in FIG. 15, the detection candidate 37, for example, a region 37a corresponding to the object 3 has been invalidated. In the example in FIG. 15, therefore, the predicted images 26 and 27 are generated for the input image 38.

Figure 16:
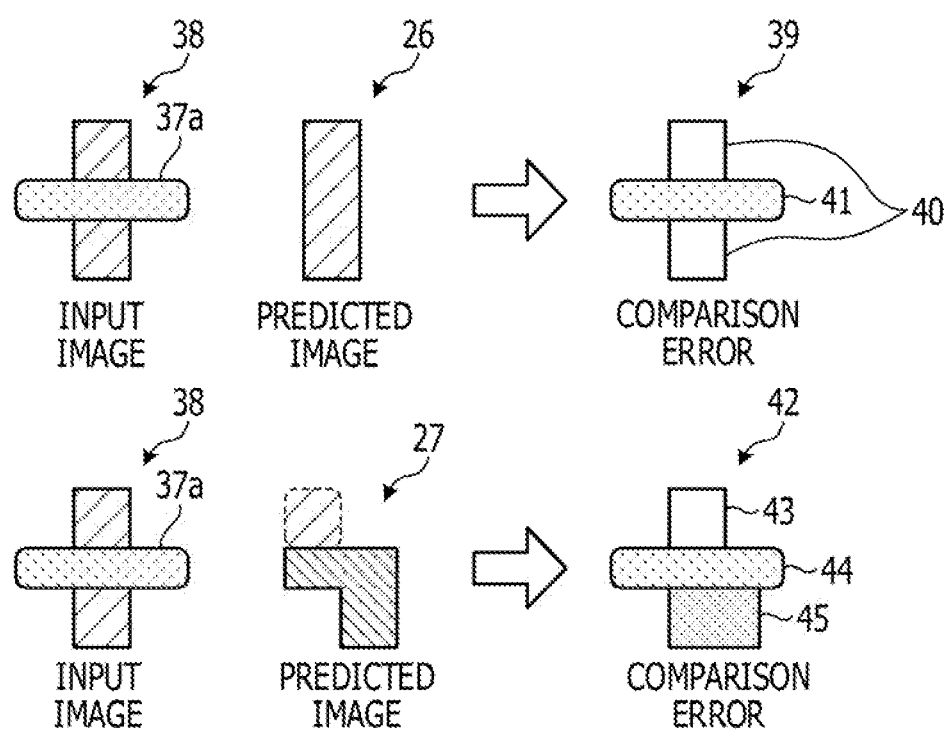
FIG. 16 is a diagram illustrating an example of how an input image is compared with predicted images for the second time.

FIG. 16 is a diagram illustrating an example of how an input image is compared with predicted images for the second time. In FIG. 16, the input image 38 is compared with the predicted images 26 and 27. As illustrated in a comparison error 39, in the comparison between the input image 38 and the predicted image 26, a region 40 that overlaps with the predicted image 26 has a small error. A region 41 corresponding to the invalidated region 37a is excluded from the comparison. As illustrated in a comparison error 42, in the comparison between the input image 38 and the predicted image 27, a region 43 that overlaps with the predicted image 27 has a small error. A region 44 corresponding to the invalidated region 37a is excluded from the comparison. A region 45 that does not overlap with the predicted image 27 has a large error. For the comparison errors 39 and 42, the second identification section 134 determines which of the predicted images 26 and 27 is correct based on, for example, the area of the region whose error is small. In the example in FIG. 16, it is assumed that the predicted image 26 is determined to be correct.

Figure 17:
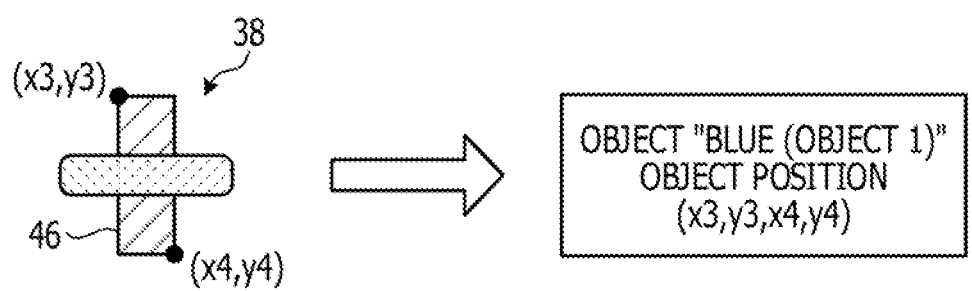
FIG. 17 is a diagram illustrating an example of a detection result for the second time.

FIG. 17 is a diagram illustrating an example of a detection result for the second time. As illustrated in FIG. 17, the second identification section 134 sets, as a detection candidate 46, the predicted image 26 that has been predicted as correct with respect to the input image 38. The second identification section 134 identifies the coordinates (x3, y3, x4, y4) of the object position of the detection candidate 46 in the input image 38. The second identification section 134 outputs the detection candidate 46 as the detection result. As the detection result, the second identification section 134 outputs information such as "object "blue (object 1)"" and "object position (x3, y3, x4, y4)."

Figure 18:
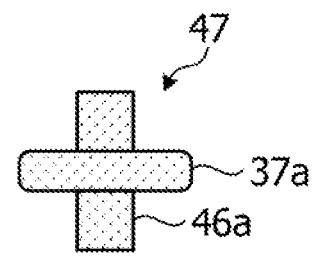
FIG. 18 is a diagram illustrating an example of a case where no object exists upon generation of predicted images of objects for the third time.

FIG. 18 is a diagram illustrating an example of a case where no object exists upon generation of predicted images of objects for the third time. In an input image 47 in FIG. 18, the region 37a and a region 46a corresponding to the detection candidate 46 (object 1) have been invalidated. In the example in FIG. 18, therefore, since all the objects to be detected have been invalidated in the input image 47 and no predicted image is generated, the detection ends.

FIG. 19 is a diagram illustrating an example of a detection candidate based on results of comparison. In a table 50 illustrated in FIG. 19, the predicted images 25 to 27 and the comparison errors 28, 31, and 34 in FIG. 13 are arranged in ascending order of errors with the results of comparison with a threshold value "0.1." As illustrated in the table 50, the predicted image number "image 31" corresponding to the predicted image 25 has an error "0.08," which is the smallest and equal to or less than the threshold value. Accordingly, the predicted image 25 is determined to be correct and serve as the detection candidate. The predicted image number "image 31" corresponds to the object 3. The predicted image number "image 11" corresponds to the object 1. The predicted image number "image 21" corresponds to the object 2.

Figure 20:
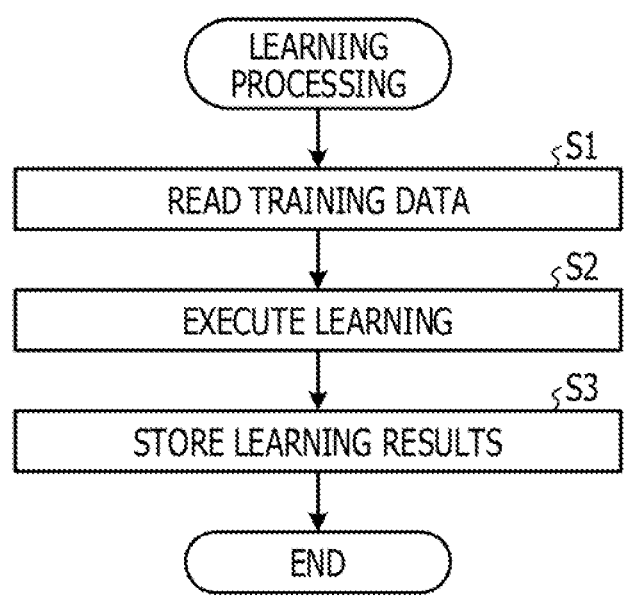
FIG. 20 is a flowchart illustrating an example of learning processing according to the first embodiment.

Next, the operation of the detection device 100 according to the first embodiment will be described. First, learning processing will be described with reference to FIG. 20. FIG. 20 is a flowchart illustrating an example of learning processing according to the first embodiment. The first generation section 132 reads training data from the training data storing section 121 (step S1). The first generation section 132 executes learning of the training data for each object (step S2) and generates learning parameters which are the learning results of individual predictors. The first generation section 132 stores the learning results of individual predictors in the learned model storing section 122 as a learned model (step S3). In this manner, the detection device 100 may learn the association between a part of the image data corresponding to a part of an object and the entire image data and the existing region of the object.

Figure 21:
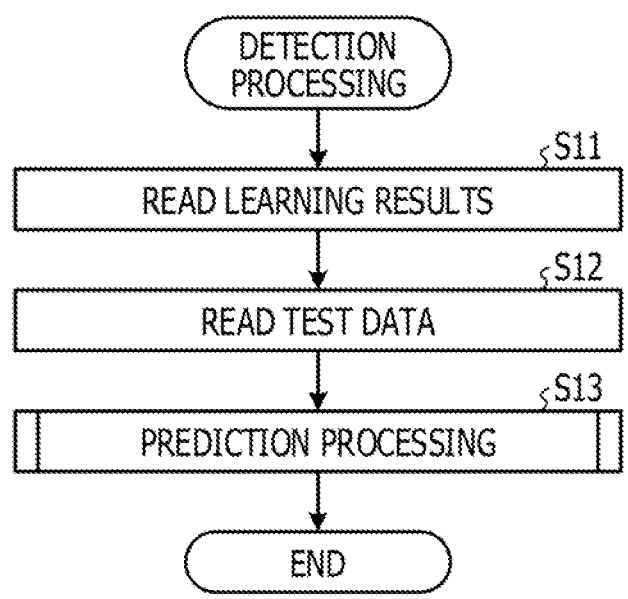
FIG. 21 is a flowchart illustrating an example of detection processing according to the first embodiment.

Next, the detection processing will be described with reference to FIG. 21, FIG. 21 is a flowchart illustrating an example of detection processing according to the first embodiment. When the first identification section 133 receives an instruction from the user to start the detection processing, for example, the first identification section 133 refers to the learned model storing section 122 and reads the learned model, for example, the learning results of individual predictors, to configure each predictor (step S11). When the second generation section 135 receives the instruction from the user to start the detection processing, for example, the second generation section 135 reads test data (input image) from the test data storing section 123 (step S12) and outputs the test data and the prediction instruction to the first identification section 133. When the first identification section 133 receives the test data and the prediction instruction from the second generation section 135, the first identification section 133 executes the prediction processing on the test data (step S13).

Figure 22:
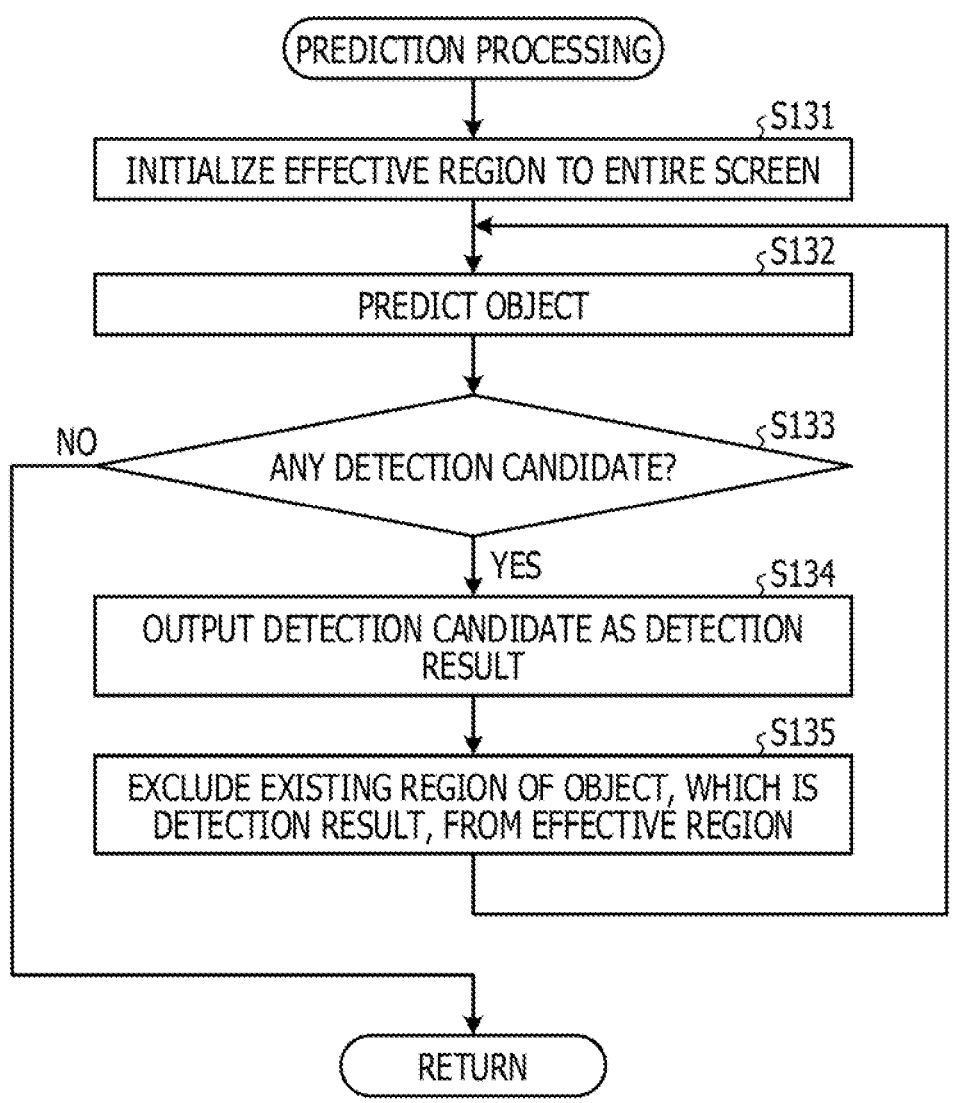
FIG. 22 is a flowchart illustrating an example of prediction processing according to the first embodiment.

The prediction processing will be described with reference to FIG. 22, FIG. 22 is a flowchart illustrating an example of prediction processing according to the first embodiment. The first identification section 133 initializes the effective region for the input image to the entire screen (step S131). Based on the prediction instruction received from the second generation section 135, the first identification section 133 inputs the input image and the input mask to each predictor to predict an object in the input image (step S132). The first identification section 133 generates predicted images, predicted masks, and object positions as prediction results. The first identification section 133 outputs the input image and the input mask to the second identification section 134, together with the predicted image, the predicted mask, and the object position of each predictor.

When the second identification section 134 receives the input image and the input mask from the first identification section 133 together with the predicted image, the predicted mask, and the object position of each predictor, the second identification section 134 compares the input image with each predicted image in the existing region represented by the corresponding predicted mask. As a result of comparison, the second identification section 134 sets, as the detection candidate, a predicted image whose error is equal to or less than the preset threshold value. The second identification section 134 determines whether or not the detection candidate exists (step S133). In a case where the second identification section 134 has determined that the detection candidate exists (step S133: Yes), the second identification section 134 outputs the detection candidate, for example, to the display section 111 and displays the detection candidate on the display section 111 as the detection result (step S134). As the existing region of the object which is the detection result, the second identification section 134 also outputs the identified existing region of the detection candidate to the second generation section 135, together with the input mask.

When the second generation section 135 receives the existing region of the object, which is the detection result, and the input mask from the second identification section 134, the second generation section 135 updates the input mask by excluding the existing region of the object, which is the detection result, from the effective region (step S135). After updating the input mask, the second generation section 135 outputs a prediction instruction including the updated input mask to the first identification section 133 and returns to step S132.

In step S133, on the other hand, in a case where the second identification section 134 has determined that the detection candidate does not exist (step S133: No), the second identification section 134 ends the prediction processing and returns to the original processing. When the second identification section 134 ends the prediction processing, the second identification section 134 ends the detection processing. In this manner, the detection device 100 may increase the detection accuracy (generalization capability) for image data including partial blocking. The detection device 100 may generate a realistic predicted image that is comparable with an input image by deep learning. This may allow the detection device 100 to generate a predicted image of an object even in a case where the object has a complex shape such as a person.

The detection device 100 performs prediction based on a part of a target object. Therefore, a possible failure to detect the target object may be reduced with the detection device 100. Moreover, since the probability that prediction of multi-dimensional data such as an image is accidentally right is low, it is less likely that an object and an object position different from the actual object and object position are selected. Therefore, false detection may be reduced with the detection device 100. Moreover, the detection device 100 performs detection again excluding an object that has already been detected. Even in a rare case where different objects have similar colors, therefore, false detection may be reduced with the detection device 100.

In this manner, the detection device 100 detects, from image data, the type and the position of a target object included in the image data. For example, the detection device 100 generates a learned model by learning training data. In the training data, cut-out image data and an existing region that correspond to a part of the target object are associated with entire image data and an existing region of the target object. The detection device 100 identifies the entire image data and the existing region of the target object that are output based on the part of the image data input to the generated learned model and are predicted from the part of the image data. The detection device 100 also identifies the position of the target object in the image data based on the result of comparison in the existing region between the identified entire image data and the image data. The detection device 100 generates image data in which the identified existing region has been invalidated on the image data. As a result, the detection device 100 may increase the detection accuracy for image data including partial blocking.

The detection device 100 compares the identified entire image data with the image data in the existing region. As a result of the comparison, the detection device 100 identifies the position of the target object in the image data based on the area of a region whose error is small. As a result, even in a case where a part of the target object is blocked, the detection device 100 may detect the target object.

In a case where there is a plurality of identified existing regions, the detection device 100 identifies the position of a corresponding target object based on the result of comparison between an identified predicted image and the image data in which an identified existing region has been invalidated. As a result, even in a case where a plurality of target objects partially overlaps with each other, the detection device 100 may detect each target object.

In the first embodiment described above, the detection device 100 generates a learned model. In another embodiment, a learned model generated in advance by another information processing device may be used. This embodiment will be described as the second embodiment. In the second embodiment, the same configurations as the configurations of the detection device 100 according to the first embodiment are denoted with the same reference signs, and repetitive description of such configurations and operations is omitted.

Figure 23:
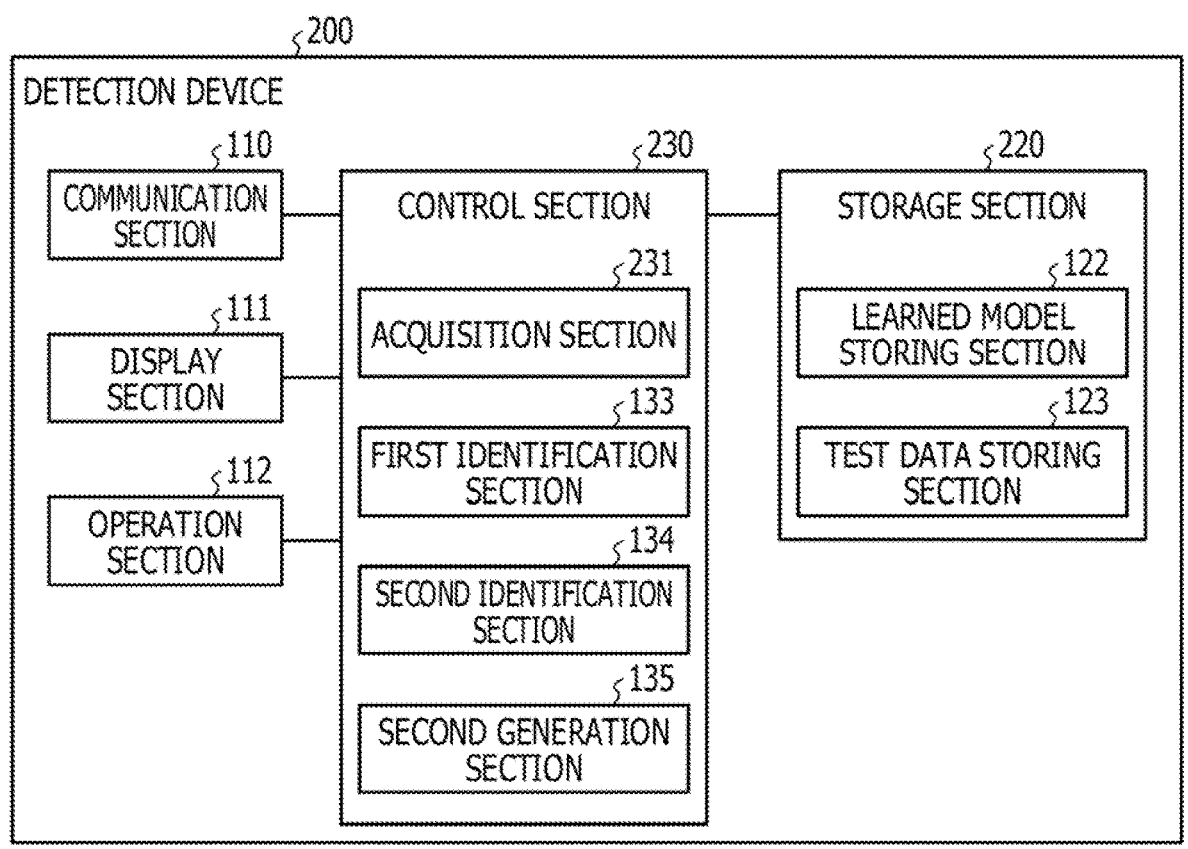
FIG. 23 is a block diagram illustrating an example of a configuration of a detection device according to a second embodiment.

FIG. 23 is a block diagram illustrating an example of a configuration of a detection device according to the second embodiment. In comparison with the detection device 100 according to the first embodiment, a detection device 200 illustrated in FIG. 23 includes a storage section 220 and a control section 230, instead of the storage section 120 and the control section 130. In comparison with the storage section 120, the storage section 220 does not include the training data storing section 121. In comparison with the control section 130, the control section 230 includes an acquisition section 231 instead of the acquisition section 131 and does not include the first generation section 132.

The acquisition section 231 receives and acquires a learned model from an information processing device, not illustrated. The acquisition section 231 stores the acquired learned model in the learned model storing section 122. The acquisition section 231 receives and acquires test data from the information processing device, not illustrated. The acquisition section 231 stores the acquired test data in the test data storing section 123. The acquisition section 231 is different from the acquisition section that corresponds to the first identification section 133 and acquires the learned model stored in the learned model storing section 122.

The operation of the detection device 200 according to the second embodiment is similar to the detection processing of the detection device 100 according to the first embodiment, and therefore the description of the operation of the detection device 200 is omitted.

In this manner, the detection device 200 detects, from image data, the type and the position of a target object included in the image data. For example, the detection device 200 acquires the learned model stored in the learned model storing section 122. The detection device 200 identifies entire image data and an existing region of the target object that are output based on a part of the image data input to the acquired learned model and are predicted from the part of the image data. The detection device 200 also identifies the position of the target object in the image data based on the result of comparison in the existing region between the identified entire image data and the image data. The detection device 200 generates image data in which the identified existing region has been invalidated on the image data. As a result, the detection device 200 may increase the detection accuracy for image data including partial blocking.

In each of the above embodiments, the CNN has been described as an example of the neural network. However, the embodiments are not limited to this example. For example, various neural networks such as a recurrent neural network (RNN) may be used. As a learning method, various publicly known methods other than error backpropagation may be employed. For example, a neural network has a multistage configuration including, for example, an input layer, an intermediate layer (hidden layer), and an output layer. Each layer has a structure in which a plurality of nodes is coupled by edges. Each layer has a function called "activation function," and an edge has "weight." A value of each node is calculated from a value of a node of a previous layer, a value of a weight of a coupling edge, and an activation function of the layer. As a calculation method, various publicly known methods may be employed.

In each of the above embodiments, still images have been described. However, the embodiments are not limited to this example. The embodiments may be applied to time-series data such as moving images. In this case, prediction at a short time earlier may be used.

Each component of each section illustrated in the drawings does not have to be physically configured as illustrated in the drawings. For example, the specific forms of distribution and integration of the sections are not limited to those illustrated in the drawings, and all or a part of the sections may be functionally or physically distributed or integrated in any arbitrary units depending on various types of loads and usage conditions. For example, the second identification section 134 and the second generation section 135 of the detection device 100 may be integrated. Each processing illustrated in the drawings is not limited to the above-described order and may be performed at the same time or may be performed in a different order as long as no contradiction arises in processing contents.

All or an arbitrary part of various types of processing functions that are executed in each device may be executed by a CPU (or a microcomputer such as an MPU or a microcontroller unit (MCU)). It goes without saying that all or an arbitrary part of various types of processing functions may be executed by a program analyzed and executed by the CPU (or the microcomputer such as the MPU or the MCU) or by hardware with wired logic.

Figure 24:
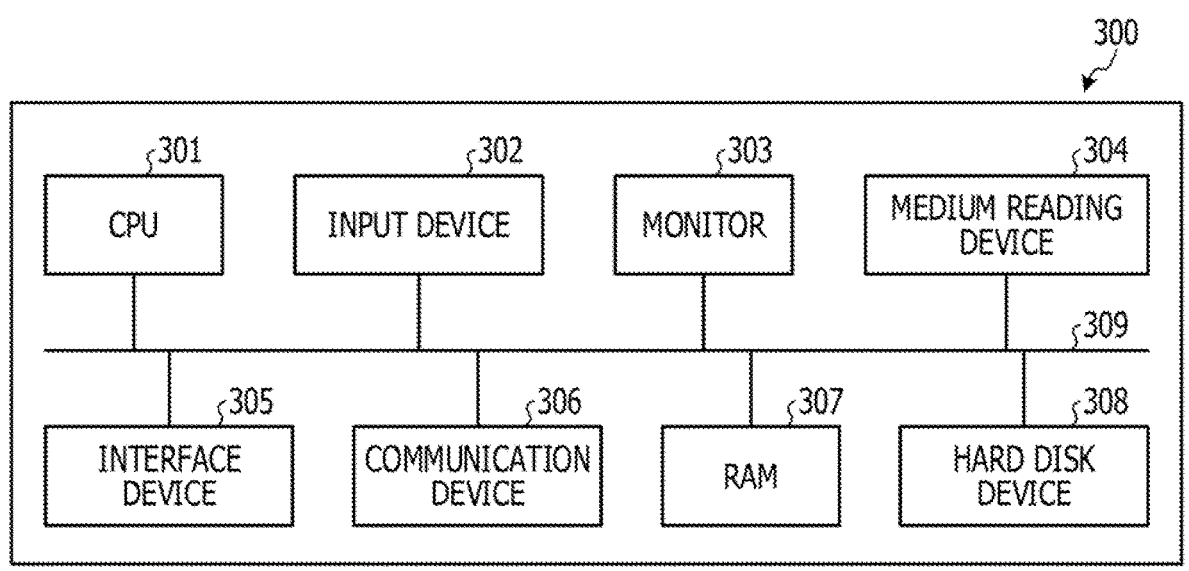
FIG. 24 is a diagram illustrating an example of a computer that executes a detection program.

The various types of processing described in each of the above embodiments may be implemented by causing a computer to execute a program prepared in advance. Hereinafter, an example of the computer that executes the program having functions similar to those described in each of the above embodiments will be described. FIG. 24 is a diagram illustrating an example of a computer that executes a detection program.

As illustrated in FIG. 24, a computer 300 includes a CPU 301, an input device 302, and a monitor 303. The CPU 301 executes various types of arithmetic processing. The input device 302 receives data input. The computer 300 also includes a medium reading device 304, an interface device 305, and a communication device 306. The medium reading device 304 reads a program and the like from a storage medium. The interface device 305 is used to be coupled to various types of devices. The communication device 306 is used to be coupled to another information processing device and the like by wire or wirelessly. The computer 300 also includes a RAM 307 and a hard disk device 308. The RAM 307 temporarily stores various types of information. Each of the devices 301 to 308 is coupled to a bus 309.

The hard disk device 308 stores the detection program having functions similar to those of the processing sections that are the acquisition section 131, the first generation section 132, the first identification section 133, the second identification section 134, and the second generation section 135 illustrated in FIG. 1. The hard disk device 308 also stores various types of data for implementing the training data storing section 121, the learned model storing section 122, the test data storing section 123, and the detection program. The hard disk device 308 may store a detection program having functions similar to those of the processing sections that are the acquisition section 231, the first identification section 133, the second identification section 134, and the second generation section 135 illustrated in FIG. 23. The hard disk device 308 may also store various types of data for implementing the learned model storing section 122, the test data storing section 123, and the detection program.

The input device 302 receives various types of information such as operation information from the user of the computer 300, for example. The monitor 303 displays various types of screens such as a display screen for the user of the computer 300. The interface device 305 is coupled to a printing device and the like, for example. The communication device 306 has, for example, functions similar to those of the communication section 110 illustrated in FIGS. 1 and 23 and is coupled to a network, not illustrated, to exchange various types of information with another information processing device.

The CPU 301 performs various types of processing by reading each program stored in the hard disk device 308, loading the program into the RAM 307, and executing the program. These programs may cause the computer 300 to function as the acquisition section 131, the first generation section 132, the first identification section 133, the second identification section 134, and the second generation section 135 illustrated in FIG. 1. These programs may also cause the computer 300 to function as the acquisition section 231, the first identification section 133, the second identification section 134, and the second generation section 135 illustrated in FIG. 23.

The above-described detection program does not have to be stored in the hard disk device 308. For example, the computer 300 may read and execute the detection program stored in a storage medium readable by the computer 300. The storage medium readable by the computer 300 corresponds to a portable recording medium such as a compact disc (CD)-ROM, a digital versatile disc (DVD), or a universal serial bus (USB) memory, a semiconductor memory such as a flash memory, a hard disk drive, or the like. Alternatively, the detection program may be stored in a device coupled to a public line, the Internet, a local area network (LAN), or the like, and the computer 300 may read and execute the detection program from the device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented detection method comprising:
in response to inputting a first image to a learned model, identifying a first estimated image from the input first image by using the learned model, the first image being an image including a region of a plurality of target objects, the first estimated image being an estimated image corresponding to entirety of a first target object being one of the plurality of target objects, the learned model being a model generated by learning training data including a partial image indicating a part of an object and a corresponding entire image indicating entirety of the object;
detecting a first region of the first target object in the first image in accordance with a comparison between the identified first estimated image and the first image, the first region being a region including a contour of entirety of the first target object;
identifying, based on a second image obtained by invalidating the first region from among the first image, a second estimated image with respect to a second target object by using the learned model, the second estimated image being an estimated image corresponding to entirety of the second target object, the second target object being one of the plurality of target objects other than the first target object; and
detecting a second region of the second target object in accordance with a comparison between the identified second estimated image and the second image, the second region being a region including a contour of entirety of the second target object, the comparison between the identified second estimated image and the second image being configured to exclude a region corresponding to the invalidated first region from the comparison between the identified second estimated image and the second image.

2. The detection method according to claim 1, wherein
the identifying of the first entire image includes identifying a plurality of entire images corresponding to respective entirety of a plurality of target objects including the first target object, and
the detecting of the existing region includes selecting the first target object based on a difference between each of the plurality of entire images and the region of the one or more target objects.

3. The detection method according to claim 2, wherein
the determining includes detecting a second target object among the plurality of target objects based on a difference between each of the plurality of entire images other than the first entire image and the region of the one or more target objects other than the existing region.

4. The detection method according to claim 1, wherein
the detecting of the existing region includes determining the existing region based on a size of a difference between the first entire image and the region of the one or more target objects.

5. A detection device comprising:
a memory; and
a processor coupled to the memory and the processor configured to:
in response to inputting a first image to a learned model, perform identification of a first estimated image from the input first image by using the learned model, the first image being an image including a region of a plurality of target objects, the first estimated image being an estimated image corresponding to entirety of a first target object being one of the plurality of target objects, the learned model being a model generated by learning training data including a partial image indicating a part of an object and a corresponding entire image indicating entirety of the object,
perform detection of a first region of the first target object in the first image in accordance with a comparison between the identified first estimated image and the first image, the first region being a region including a contour of entirety of the first target object,
identify, based on a second image obtained by invalidating the first region from among the first image, a second estimated image with respect to a second target object by using the learned model, the second estimated image being an estimated image corresponding to entirety of the second target object, the second target object being one of the plurality of target objects other than the first target object, and
detect a second region of the second target object in accordance with a comparison between the identified second estimated image and the second image, the second region being a region including a contour of entirety of the second target object, the comparison between the identified second estimated image and the second image being configured to exclude a region corresponding to the invalidated first region from the comparison between the identified second estimated image and the second image.

6. The detection device according to claim 5, wherein
the identification of the first entire image includes identifying a plurality of entire images corresponding to respective entirety of a plurality of target objects including the first target object, and
the detection of the existing region includes selecting the first target object based on a difference between each of the plurality of entire images and the region of the one or more target objects.

7. The detection device according to claim 6, wherein
the determination includes detecting a second target object among the plurality of target objects based on a difference between each of the plurality of entire images other than the first entire image and the region of the one or more target objects other than the existing region.

8. The detection device according to claim 5, wherein
the detection of the existing region includes determining the existing region based on a size of a difference between the first entire image and the region of the one or more target objects.

9. A non-transitory computer-readable medium storing instructions executable by one or more computers, the instructions comprising:
one or more instructions for identifying, in response to inputting a first image to a learned model, a first estimated image from the input first image by using the learned model, the first image being an image including a region of a plurality of target objects, the first estimated image being an estimated image corresponding to entirety of a first target object being one of the plurality of target objects, the learned model being a model generated by learning training data including a partial image indicating a part of an object and a corresponding entire image indicating entirety of the object;

one or more instructions for detecting a first region of the first target object in the first image in accordance with a comparison between the identified first estimated image and the first image, the first region being a region including a contour of entirety of the first target object;

one or more instructions for identifying, based on a second image obtained by invalidating the first region from among the first image, a second estimated image with respect to a second target object by using the learned model, the second estimated image being an estimated image corresponding to entirety of the second target object, the second target object being one of the plurality of target objects other than the first target object; and detecting a second region of the second target object in accordance with a comparison between the identified second estimated image and the second image, the second region being a region including a contour of entirety of the second target object, the comparison between the identified second estimated image and the second image being configured to exclude a region corresponding to the invalidated first region from the comparison between the identified second estimated image and the second image.

10. The medium according to claim 9, wherein
the identifying of the first entire image includes identifying a plurality of entire images corresponding to respective entirety of a plurality of target objects including the first target object, and
the detecting of the existing region includes selecting the first target object based on a difference between each of the plurality of entire images and the region of the one or more target objects.

11. The medium according to claim 10, wherein
the determining includes detecting a second target object among the plurality of target objects based on a difference between each of the plurality of entire images other than the first entire image and the region of the one or more target objects other than the existing region.

12. The medium according to claim 9, wherein
the detecting of the existing region includes determining the existing region based on a size of a difference between the first entire image and the region of the one or more target objects.

* * * * *